US009113006B2

United States Patent
Sasaki

(10) Patent No.: US 9,113,006 B2
(45) Date of Patent: *Aug. 18, 2015

(54) SYSTEM, INFORMATION PROCESSING APPARATUS AND NON-TRANSITORY COMPUTER READABLE MEDIUM

(71) Applicant: BROTHER KOGYO KABUSHIKI KAISHA, Nagoya-shi, Aichi-ken (JP)

(72) Inventor: Kenta Sasaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,746

(22) Filed: Mar. 10, 2014

(65) Prior Publication Data

US 2014/0253979 A1  Sep. 11, 2014

(30) Foreign Application Priority Data

Mar. 11, 2013  (JP) .................................. 2013-047544

(51) Int. Cl.
*G06F 3/12* (2006.01)
*H04N 1/00* (2006.01)
*H04N 1/32* (2006.01)

(52) U.S. Cl.
CPC ....... *H04N 1/00225* (2013.01); *H04N 1/00244* (2013.01); *H04N 1/32106* (2013.01);
(Continued)

(58) Field of Classification Search
CPC ............ G06F 13/387; G06F 17/30905; G06F 1/1632; G06F 21/34; G06F 21/608; G06F 3/1222; G06F 3/1238; G06F 3/1273; G06F 3/1293; G06F 21/10; G06F 21/31; G06F 21/32
USPC .............. 358/1.15, 1.16, 1.14, 474, 1.1, 1.13, 358/443, 448; 709/223, 229, 202, 203, 219, 709/220, 224, 201, 206, 208, 217, 218, 225, 709/227, 228, 230, 231, 246, 250
See application file for complete search history.

(56) References Cited

U.S. PATENT DOCUMENTS 6,289,371 B1  9/2001  Kumpf et al.
6,633,913 B1  10/2003  Chalstrom et al.
(Continued)

FOREIGN PATENT DOCUMENTS

CN  1420660 A  5/2003
JP  2008-236702 A  10/2008
(Continued)

OTHER PUBLICATIONS

Extended European Search Report issued in EP 13152403.5, Jun. 26, 2013.
(Continued)

*Primary Examiner* — Negussie Worku
(74) *Attorney, Agent, or Firm* — Merchant & Gould PC

(57) ABSTRACT

Computer readable instructions, when executed by a processor, may cause an information processing apparatus to receive, from an operation apparatus, a reading instruction for instructing an image reading apparatus to execute a reading operation and specific service identification information. The computer readable instructions may cause the information processing apparatus to acquire the setting information associated with the specific service identification information from the memory, and transmit the acquired setting information to the operation apparatus. The computer readable instructions may cause the information processing apparatus to receive specific setting information from the operation apparatus, and transmit the specific setting information to a particular image reading apparatus for reading image data in the particular image reading apparatus. The computer readable instructions may cause the information processing apparatus to receive image data from the particular image reading apparatus, and transmit the image data to the service providing apparatus.

13 Claims, 8 Drawing Sheets

(52) U.S. Cl.
CPC  *H04N2201/3205* (2013.01); *H04N 2201/3208* (2013.01); *H04N 2201/3226* (2013.01); *H04N 2201/3274* (2013.01); *H04N 2201/3278* (2013.01)

(56) References Cited

U.S. PATENT DOCUMENTS

| | | | |
|---|---|---|---|
| 6,782,426 B1* | 8/2004 | Kuroshima et al. | 709/229 |
| 7,106,464 B1 | 9/2006 | Brylov | |
| 7,231,660 B1 | 6/2007 | Daude et al. | |
| 7,246,147 B2 | 7/2007 | Kim et al. | |
| 7,765,271 B1 | 7/2010 | Bahr et al. | |
| 7,814,081 B2* | 10/2010 | Futagawa | 707/703 |
| 7,916,333 B2 | 3/2011 | Yoshio et al. | |
| 8,077,336 B2* | 12/2011 | Suzuki | 358/1.15 |
| 8,150,916 B2* | 4/2012 | Togashi et al. | 709/204 |
| 2002/0004802 A1 | 1/2002 | Shima | |
| 2003/0101236 A1 | 5/2003 | Ohara | |
| 2003/0115018 A1 | 6/2003 | Sharma et al. | |
| 2006/0026434 A1 | 2/2006 | Yoshida et al. | |
| 2006/0117182 A1 | 6/2006 | Wolff | |
| 2006/0274358 A1 | 12/2006 | Fukui et al. | |
| 2007/0033588 A1 | 2/2007 | Landsman | |
| 2007/0208827 A1 | 9/2007 | Fukui et al. | |
| 2008/0068647 A1 | 3/2008 | Isobe et al. | |
| 2008/0120707 A1 | 5/2008 | Ramia | |
| 2008/0144095 A1 | 6/2008 | Suzuki | |
| 2008/0204827 A1 | 8/2008 | Yoshio et al. | |
| 2009/0086271 A1 | 4/2009 | Shiokawa | |
| 2009/0116052 A1 | 5/2009 | Matsuzawa | |
| 2009/0201541 A1 | 8/2009 | Neogi et al. | |
| 2009/0296133 A1 | 12/2009 | Kawabushi et al. | |
| 2010/0005136 A1 | 1/2010 | Ferlitsch et al. | |
| 2010/0033763 A1 | 2/2010 | Anooshfar | |
| 2010/0208297 A1 | 8/2010 | Takamiya | |
| 2010/0231949 A1 | 9/2010 | Mori | |
| 2010/0315686 A1 | 12/2010 | Hong et al. | |
| 2011/0238832 A1 | 9/2011 | Goyal | |
| 2011/0242586 A1 | 10/2011 | Usui | |
| 2012/0162702 A1 | 6/2012 | Takamiya | |
| 2012/0182575 A1 | 7/2012 | Ikeda | |
| 2012/0254368 A1* | 10/2012 | Sasaki et al. | 709/219 |
| 2012/0271589 A1* | 10/2012 | Nagano et al. | 702/141 |
| 2012/0314245 A1 | 12/2012 | Nakashima | |
| 2012/0314250 A1 | 12/2012 | Ito | |
| 2013/0094056 A1* | 4/2013 | Kobayashi | 358/1.15 |
| 2013/0188212 A1 | 7/2013 | Pardhan et al. | |
| 2013/0262674 A1* | 10/2013 | Nagano et al. | 709/225 |
| 2014/0188883 A1* | 7/2014 | Sasaki et al. | 707/737 |
| 2014/0280512 A1* | 9/2014 | Mori | 709/203 |

FOREIGN PATENT DOCUMENTS

| | | |
|---|---|---|
| JP | 2013-149254 A | 8/2013 |
| WO | 2011-105013 A1 | 9/2011 |

OTHER PUBLICATIONS

US Office Action for U.S. Appl. No. 13/356,554 mailed May 22, 2014 (9 pages).

US Office Action for U.S. Appl. No. 13/356,554 mailed Oct. 25, 2013 (8 pages).

Office Action issued in related Chinese application No. 201310024582.2, Jan. 4, 2015.

U.S. Office Action issued in related U.S. Appl. No. 13/356,554, Dec. 29, 2014.

Non-Final Office Action issued in related U.S. Appl. No. 14/202,884, mailed Apr. 14, 2015.

* cited by examiner

FIG. 5

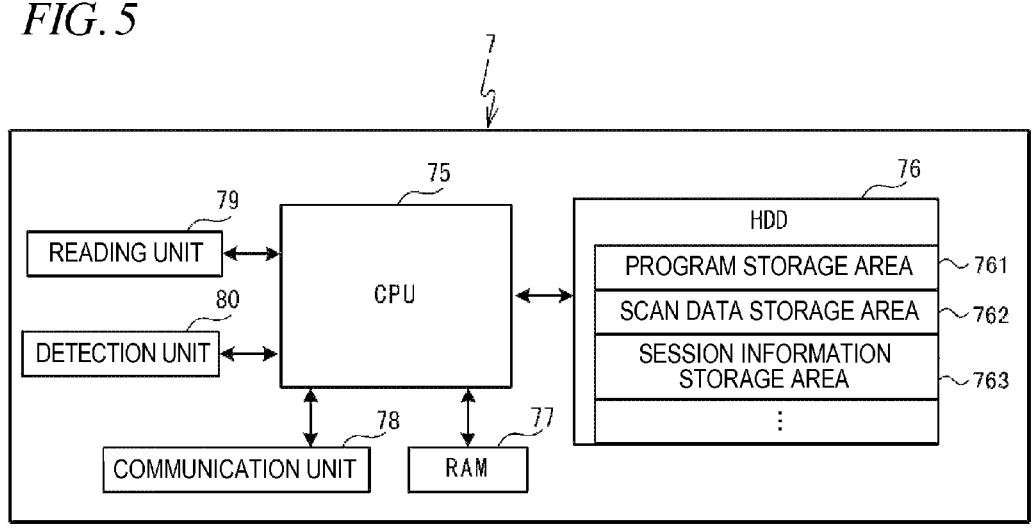

FIG. 6

| SCANNER INFORMATION | ACCESS TOKEN | MODEL TYPE | STATUS | DOCUMENT PLACEMENT | THE NUMBER OF DOCUMENTS | ... |
|---|---|---|---|---|---|---|
| P001 | XXXX | M001 | ON-LINE | NO PLACEMENT | 0 SHEET | ... |
| P002 | XXXX | M001 | ON-LINE | PLACEMENT | 30 SHEETS | ... |
| P003 | XXXX | M001 | OFF-LINE | NO PLACEMENT | 0 SHEET | ... |
| P004 | XXXX | M002 | ON-LINE | NO PLACEMENT | 0 SHEET | ... |
| P005 | YYYY | M001 | ON-LINE | NO PLACEMENT | 0 SHEET | ... |
| : | : | : | : | : | : | : |

FIG. 7

| MODEL TYPE | MAXIMUM RESOLUTION | DUPLEX READING | READING SPEED | COLOR | SIZE | ... |
|---|---|---|---|---|---|---|
| M001 | 600dpi | NON-CORRESPONDENCE | 24 SHEETS /MINUTE | COLOR, MONOCHROME | A3、A4、B5 NAME CARD SIZE | ... |
| M002 | 200dpi | CORRESPONDENCE | 12 SHEETS /MINUTE | MONOCHROME | A3、A4、B5 | ... |

FIG. 8

| SERVICE IDENTIFICATION INFORMATION | URL | CATEGORY | SETTING INFORMATION ||||| |
|---|---|---|---|---|---|---|---|
| | | | RESOLUTION | COLOR | SIZE | REDUCTION SETTING | ASSOCIATION SERVICE |
| S001 | http://aa | DOCUMENT | 300 dpi OR HIGHER, MAXIMUM RESOLUTION | FIRST PAGE: COLOR SECOND PAGE AND THEREAFTER: MONO-CHROME | FIRST PAGE: A4 SECOND PAGE AND THEREAFTER: DOUBLE PAGE SPREAD (A3) | LOWERING THE RESOLUTION TO 200 dpi | NO |
| S002 | http://bb | NAME CARD | 300 dpi OR LOWER | MONOCHROME | NAME CARD SIZE | LOWERING THE RESOLUTION TO 100 dpi | OCR SERVICE FOR NAME CARD |
| S003 | http://cc | RECEIPT | 300 dpi OR LOWER | MONOCHROME | RECEIPT SIZE | LOWERING THE RESOLUTION TO 100 dpi | OCR SERVICE FOR RECEIPT |
| S004 | http://dd | ARTICLE | 300 dpi | COLOR | A4 | CHANGE TO MONOCHROME | NO |
| ... | ... | ... | ... | ... | ... | ... | ... |

SYSTEM, INFORMATION PROCESSING APPARATUS AND NON-TRANSITORY COMPUTER READABLE MEDIUM

CROSS REFERENCE TO RELATED APPLICATION

This application is based upon and claims the benefit of priority of Japanese Patent Application No. 2013/047544 filed on Mar. 11, 2013, the contents of which are incorporated herein by reference in its entirety.

BACKGROUND

The disclosure relates to an information processing apparatus enabling an apparatus, which provides a service useable on a Web page, to acquire data and a network system.

In recent years, a variety of data for various services useable on a Web page can be uploaded. For example, in a related read image transfer system, an image transfer apparatus connected to an image reading apparatus and a web log server are connected through a network. The image transfer apparatus controls the image reading apparatus to thus read out image information from a document and transfers the read image information to the web log server. The web log server provides a web log site in which an image based on the transferred image information is posted.

SUMMARY

Regarding a technology of uploading various data, a following example is considered. That is, a service providing apparatus provides a Web page on which an icon is displayed. When the icon is operated, the image information read out by the image reading apparatus is automatically uploaded to a web site that is provided by the service providing apparatus. In this example, the image reading apparatus should adjust an image reading setting, depending on a specification that is demanded by the service providing apparatus. However, the specification that is demanded by the service providing apparatus has not been considered. For this reason, a user should manually set the reading setting of the image reading apparatus, depending on the specification that is demanded by the service providing apparatus.

An object of the disclosure is to provide an information processing apparatus that automatically acquires a reading setting corresponding to a specification, which is demanded by a service providing apparatus, and causes the service providing apparatus to acquire image data of the specification, which is demanded by the service providing apparatus, and a network system.

A system comprising:
an information processing apparatus; and
a particular image reading apparatus,
wherein the information processing apparatus comprises:
a first processor; and
first memory storing computer readable instructions, when executed by the first processing, causing the information processing apparatus to:
store, in a memory, service identification information for identifying a service providing apparatus, and setting information representing a specification of a reading setting of an image reading apparatus for the service providing apparatus, in association with the service identification information;
receive, from an operation apparatus, a reading instruction for instructing an image reading apparatus to execute a reading operation and specific service identification information;
acquire the setting information associated with the specific service identification information from the memory;
transmit the acquired setting information to the operation apparatus;
receive specific setting information from the operation apparatus;
transmit the specific setting information to the particular image reading apparatus for reading image data in the particular image reading apparatus;
receive image data from the particular image reading apparatus; and transmit the image data to the service providing apparatus, and
wherein the particular image reading apparatus comprises:
a second processor; and
second memory storing computer readable instructions, when executed by the second processor, causing the particular image reading apparatus to:
receive the specific setting information from the information processing apparatus;
read image data based on the specific setting information; and
transmit the image data to the information processing apparatus.

An information processing apparatus comprising:
a processor; and
memory storing computer readable instructions, when executed by the processor, causing the information processing apparatus to:
store, in a memory, service identification information for identifying a service providing apparatus, and setting information representing a specification of a reading setting of an image reading apparatus for the service providing apparatus, in association with the service identification information;
receive, from an operation apparatus, a reading instruction for instructing an image reading apparatus to execute a reading operation and specific service identification information;
acquire the setting information associated with the specific service identification information from the memory;
transmit the acquired setting information to the operation apparatus;
receive specific setting information from the operation apparatus;
transmit the specific setting information to a particular image reading apparatus for reading image data in the particular image reading apparatus;
receive image data from the particular image reading apparatus; and
transmit the image data to the service providing apparatus.

A non-transitory computer-readable medium storing computer-readable instructions that, when executed by a processor, cause an information processing apparatus to:
store, in a memory, service identification information for identifying a service providing apparatus, and setting information representing a specification of a reading setting of an image reading apparatus for the service providing apparatus, in association with the service identification information;
receive, from an operation apparatus, a reading instruction for instructing an image reading apparatus to execute a reading operation and specific service identification information;
acquire the setting information associated with the specific service identification information from the memory;
transmit the acquired setting information to the operation apparatus;
receive specific setting information from the operation apparatus;

transmit the specific setting information to a particular image reading apparatus for reading image data in the particular image reading apparatus;

receive image data from the particular image reading apparatus; and transmit the image data to the service providing apparatus.

BRIEF DESCRIPTION OF DRAWINGS

FIG. 5 shows an example of an electrical configuration of a scanner apparatus 7.

FIG. 6 is an example of a data configuration view of a scanner data table 82.

FIG. 7 is an example of a data configuration view of a scanner function data table 83.

FIG. 8 is an example of a data configuration view of a service management data table 84.

DESCRIPTION OF EXEMPLARY EMBODIMENTS

1. Outline of Configuration of Network System 1

Figure 1:
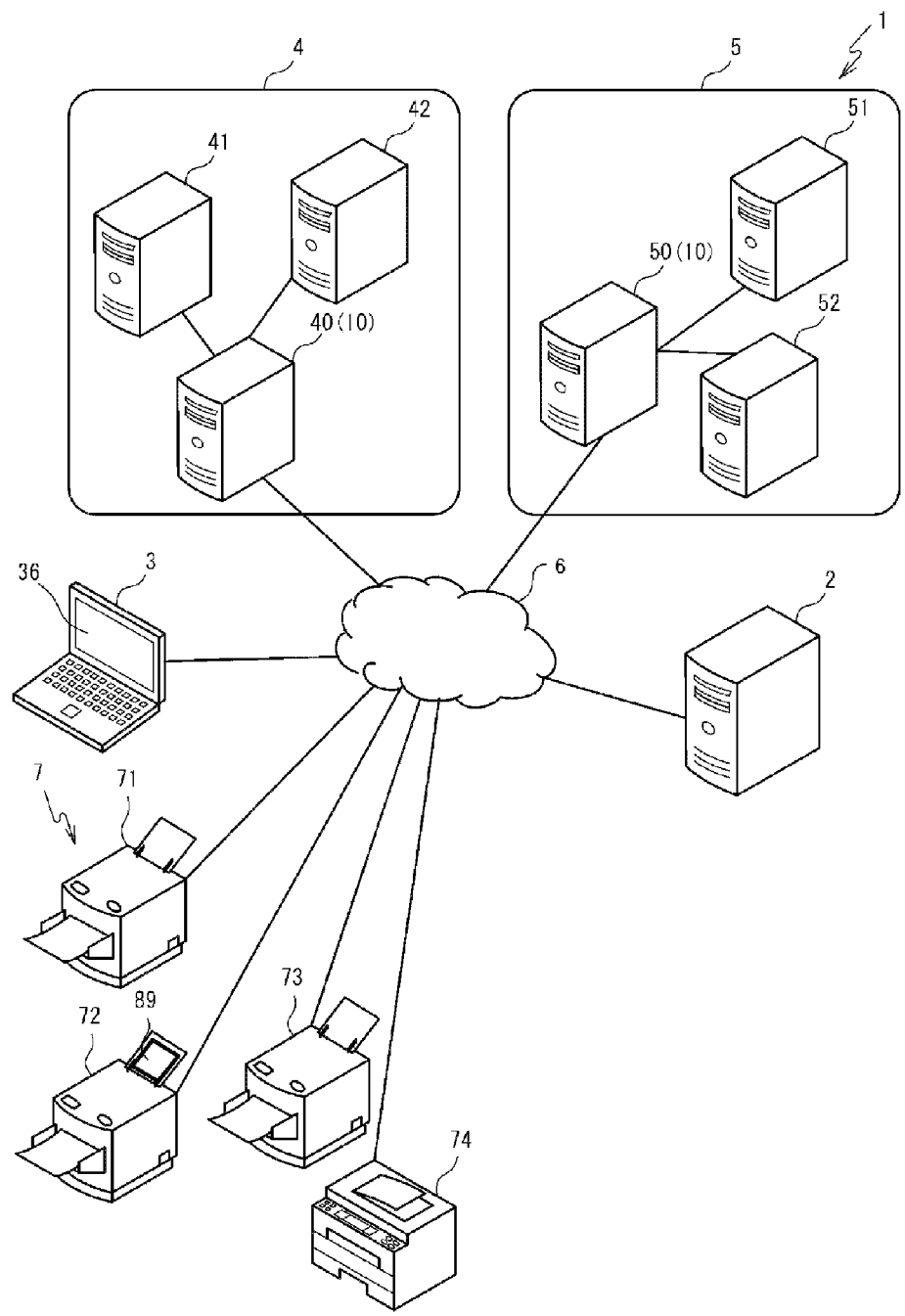
FIG. 1 is an example of schematic configuration view of a network system 1.

An illustrative embodiment of the disclosure will be described with reference to the drawings. A configuration of a network system 1 of this illustrative embodiment is described with reference to FIG. 1. As shown in FIG. 1, the network system 1 includes a central server 2, an operation apparatus 3, scanner apparatuses 71, 72, 73, 74 and network services 4, 5. The scanner apparatuses 71, 72, 73, 74 may be reading apparatuses that can read an image. For example, the scanner apparatus may be a printing apparatus having a scanner function. In the example shown in FIG. 1, a document 89 that is a reading target is placed on the scanner apparatus 72. In the meantime, the central server 2 is an example of the information processing apparatus of the disclosure. The scanner apparatuses 71, 72, 73, 74 are examples of the image reading apparatus of the disclosure. In addition to the scanner apparatuses 71, 72, 73, 74, a scanner apparatus is connected to a network 6. In the below descriptions, when collectively mentioning the scanner apparatuses 71, 72, 73, 74 and the scanner apparatus (not shown) or not specifying any one, it may be referred to as a scanner apparatus 7.

The network service 4 includes an external server 40. The network service 5 includes an external server 50. The external server 40 provides the network service 4 of a company that is different from a manufacturer of the scanner apparatus 7.

The external server 50 provides the network service 5 of a company that is different from the manufacturer of the scanner apparatus 7 and is also different from the company of the external server 40. In other words, the external server 40 and the external server 50 are server apparatuses that are managed by the companies providing the service through the network 6. The external server 40 and the external server 50 are Web servers that are used so as to provide a service, for example.

An external server (not shown) is also connected to the network 6, in addition to the external servers 40, 50. In the below descriptions, when collectively mentioning the external servers 40, 50 and the external server (not shown) or not specifying any one, it may be referred to as an external server 10.

The network service 4 includes a storage server 41 and a storage server 42. The network service 5 includes a storage server 51 and a storage server 52. At least one storage server may be provided for each network service. Instead of the storage server, the external server 40 or external server 50 may have a storage area of data that is used in the network service. In this case, the storage servers are not required. The external server 40, the external server 50 and the storage servers 41, 42, 51, 52 provide a service that can be used on a Web page. The external server 40, the external server 50, the storage server 41, the storage server 42, the storage server 51 and the storage server 52 are examples of the service providing apparatus of the disclosure.

The operation apparatus 3 uses the services that are provided by the network service 4 and the network service 5. Specifically, the operation apparatus 3 acquires a Web page from the external server 40 or external server 50 and uses the network service 4 and the network service 5. The operation apparatus 3 uses data that is stored in the storage servers 41, 42, 51, 52.

The operation apparatus 3 may be a general PC. The operation apparatus 3 may be a portable terminal apparatus such as a smart phone. The operation apparatus 3 may be an apparatus that can perform information processing. In the meantime, the central server 2, the scanner apparatus 7, the operation apparatus 3, the external server 40 and the external server 50, which are shown in FIG. 1, can perform communication with each other through the network 6. The scanner apparatus 7 may be connected to the network 6 through a relay apparatus such as a PC (not shown).

2. Outline of Operations of Network System 1

Operations of the network system 1 are described with reference to FIG. 2. In the below descriptions, it is assumed that the network service 5 provides a document service. A user of the operation apparatus 3 posts a document to the document service. In this illustrative embodiment, the document is the document 89. The document service is a service enabling the document, which is posted by the user, to be used through the network service 5.

Figure 2:
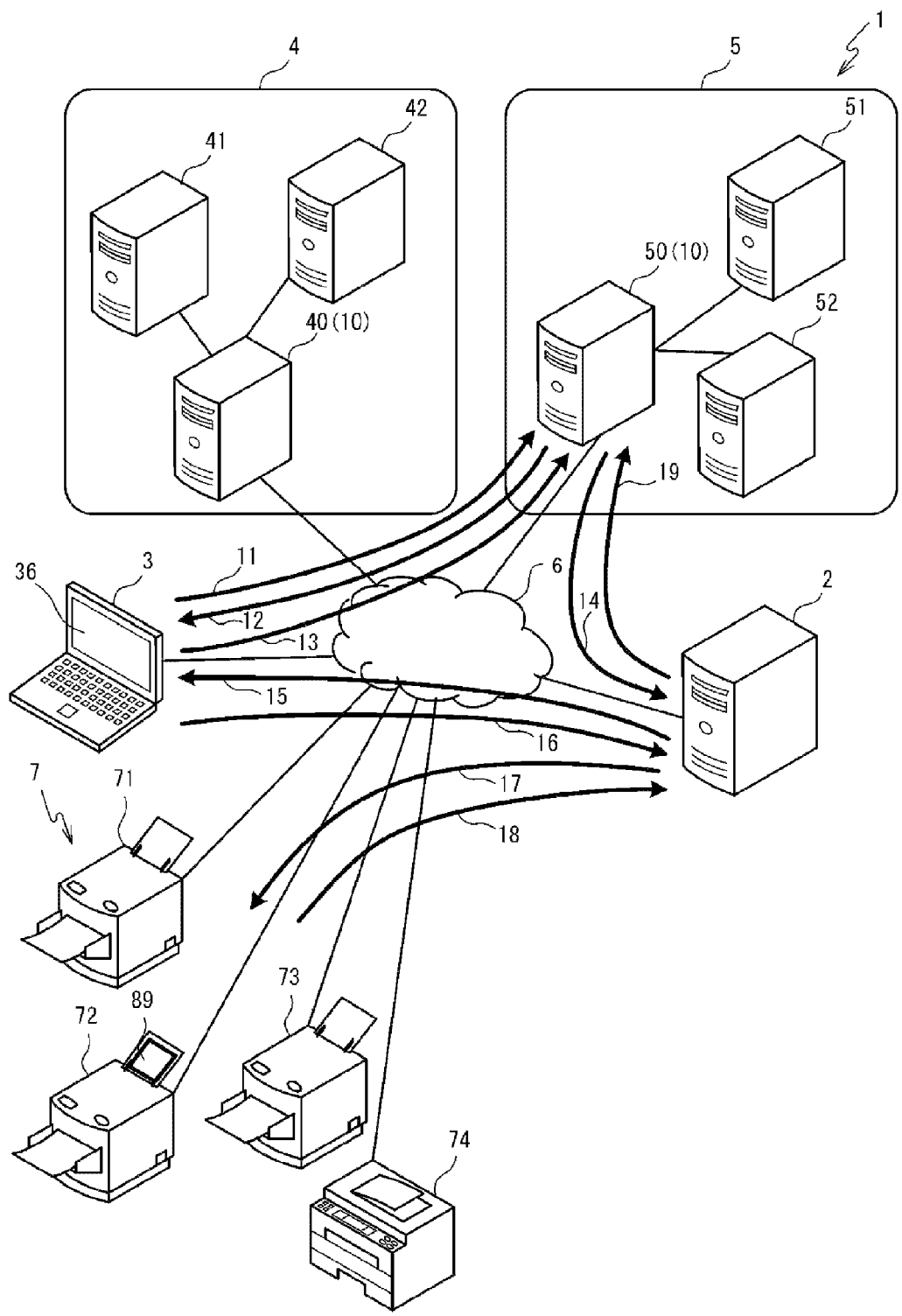
FIG. 2 illustrates an example of a processing operation of the network system 1.

First, as shown with an arrow 11 of FIG. 2, the operation apparatus 3 accesses the external server 50. At this time, the operation apparatus 3 requests the external server 50 to transmit a Web page. Then, as shown with an arrow 12, the operation apparatus 3 acquires a Web page 91 shown in FIG. 3 from the external server 50. The acquired Web page 91 is displayed on a display unit 36 that is controlled by the operation apparatus 3. In the meantime, it is necessary to execute login processing so as to use the network service 5.

The user can select a case where the scanner apparatus 7 reads the document 89 and to post image data of the document and a case where an image file stored in an HDD of the operation apparatus 3 is posted. When posting the image file, the user operates the Web page 91 by using the operation apparatus 3, selects the image file and operates a posting button 918. When the posting button 918 is operated, the selected image file is transmitted to the external server 50. The external server 50 makes a document based on the image file available (usable) through the network service 5.

When enabling the scanner apparatus 7 to read the document 89 and to post image data of the document, the user operates a scan execution button displayed on the operation apparatus 3 by using the operation apparatus 3. For example, the user operates a scan execution button 913 of the Web page 91 (refer to FIG. 3). The scan execution button 913 is an example of the operation information of the disclosure.

In this illustrative embodiment, when the scan execution button is executed, information indicating that the scan execution button is operated, a user ID and the like are transmitted to the external server 50, as shown with an arrow 13 of FIG. 2. The user ID represents information for identifying a user who operates the operation apparatus 3. The external server 50 specifies an access token corresponding to the received user ID. The access token represents information indicating whether the user who is using the network service 4 or network service 5 has an authority to use the central server 2. The access token is also information for identifying the user who operates the operation apparatus 3.

Then, as shown with an arrow 14, a reading instruction, service identification information (which will be described later), the access token, a remaining amount (which will be described later) and the like are transmitted from the external server 50 to the central server 2. That is, as the scan execution button is operated by the operation apparatus 3, the central server 2 receives the reading instruction. The reading instruction represents information of an instruction that causes the scanner apparatus 7, which can be used by the operation apparatus 3, to execute a reading operation as the scan execution button is operated. In the meantime, the login processing for accessing the central server 2 may be executed by the operation apparatus 3 before the operation instruction is transmitted to the central server 2.

The central server 2 having received the operation instruction prepares setting information relating to the service of the external server 50 and a Web page on which scanner information of the scanner apparatus 7, which is possessed by the user of the operation apparatus 3, is displayed. The setting information represents information of a reading setting corresponding to a specification that is demanded by the external server 10. The scanner information represents information for identifying the scanner apparatus 7. In the meantime, the scanner information is an example of the apparatus identification information of the disclosure.

As shown with an arrow 15 of FIG. 2, the prepared Web page is transmitted to the operation apparatus 3 and is displayed on the display unit 36. The operation apparatus 3 determines scanner information of the scanner apparatus 7, which executes the reading operation, and setting information, in response to an operation of the user. The operation apparatus 3 operates the scan execution button of the Web page, in response to an operation of the user. When the scan execution button is operated, the determined scanner information and setting information are transmitted to the central server 2, as shown with an arrow 16.

As shown with an arrow 17, the central server 2 transmits the determined setting information to the scanner apparatus 7 corresponding to the determined scanner information. The scanner apparatus 7 performs a reading operation of the document 89 with a reading setting corresponding to the determined setting information, thereby preparing image data. As shown with an arrow 18, the scanner apparatus 7 uploads the image data to the central server 2. As shown with an arrow 19, the external server 50 downloads the image data from the central server 2. Thereby, the image data of the document 89 read in the scanner apparatus 7 is acquired by the external server 50. That is, the image data can be used through the network service 5.

In the meantime, when a storage server is provided for the network service 5, the external server 50 may transmit the image data downloaded from the central server 2 to the storage server 51 or storage server 52. The storage server 52 may download the image data from the central server 2. The downloaded image data is stored in a predetermined storage area that can be accessed using a user ID logged in the network service 5.

Although not shown, the operation apparatus 3 requests the image data, which can be used through the network service 5, from the external server 50 through a Web browser of the operation apparatus 3, for example. When the request for the image data is received, the external server 50 transmits a Web page. The transmitted Web page causes the operation apparatus 3 to access the image data stored in the external server 50, the storage server 51 or the storage server 52. Then, the operation apparatus 3, which is a source of the request, downloads the image data from the external server 50, the storage server 51 or the storage server 52 that stores the requested image data.

3. Electrical Configuration of Central Server 2

Figure 4:
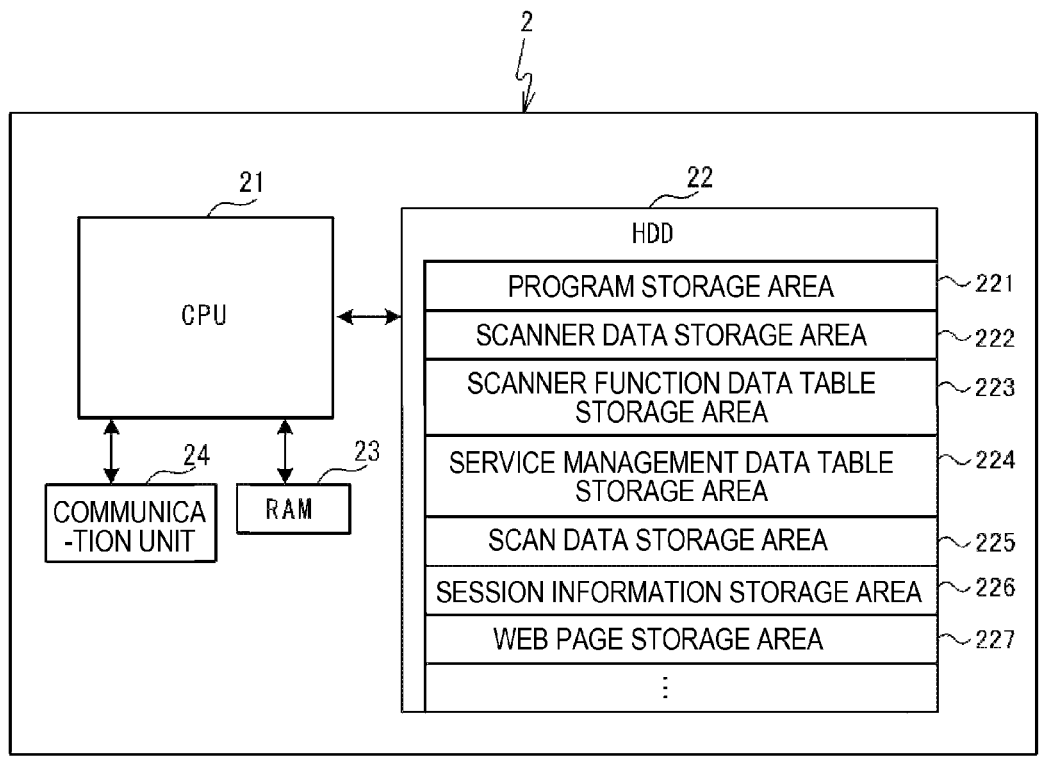
FIG. 4 shows an example of an electrical configuration of a central server 2.

An electrical configuration of the central server 2 of this illustrative embodiment is described with reference to FIG. 4. The central server 2 has a CPU 21, an HDD 22, a RAM 23 and a communication unit 24. The HDD 22, the RAM 23 and the communication unit 24 are electrically connected to the CPU 21, respectively. The CPU 21 functions as a computer that controls the central server 2. The CPU 21 is an example of a processor.

The HDD 22 includes a program storage area 221, a scanner data table storage area 222, a scanner function data table storage area 223, a service management data table storage area 224, a scan data storage area 225, a session information storage area 226 and a Web page storage area 227.

Figure 9:
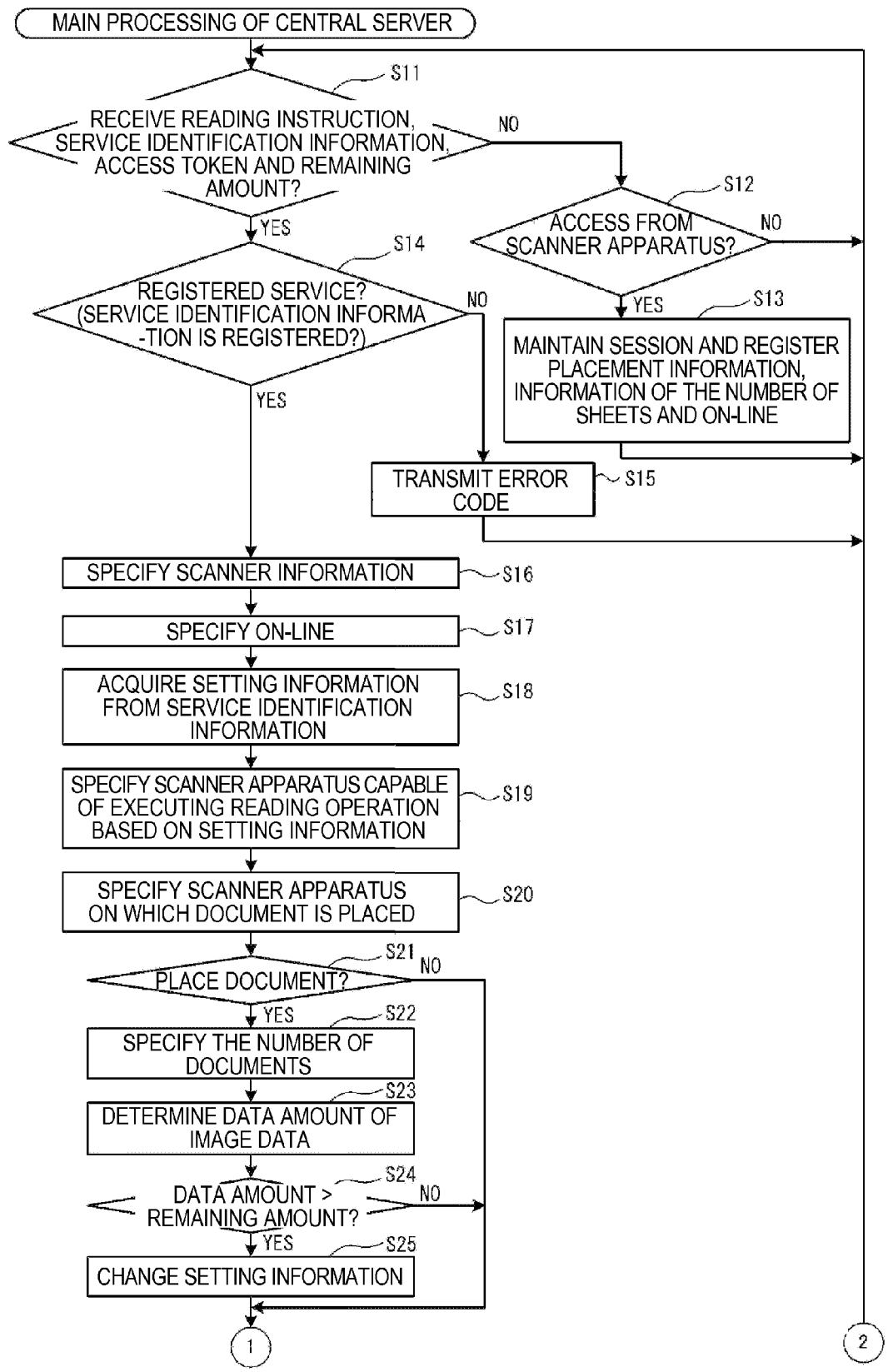
FIG. 9 is an example of a flow chart of main processing of the central server 2.
Figure 10:
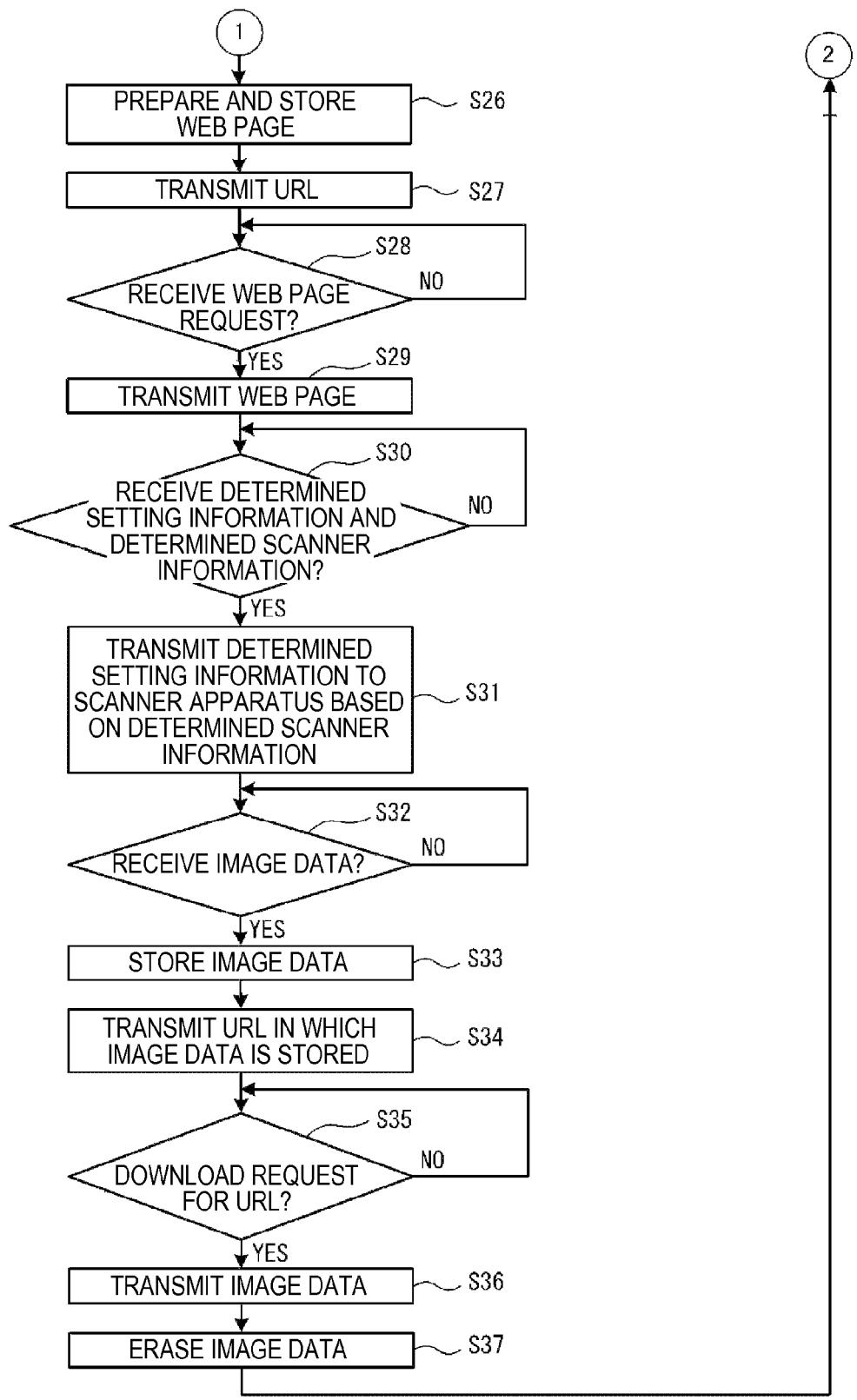
FIG. 10 is an example of a flow chart of the main processing of the central server 2.

The program storage area 221 stores a program of main processing of the central server 2, which is shown in FIGS. 9 and 10, and the like. In the meantime, the program may be downloaded from a predetermined server on the network 6, for example. The program may be recorded in a recording medium such as a CD-ROM and the like and may be read and input through a drive.

The scanner data table storage area 222 stores a scanner data table 82 (which will be described later) shown in FIG. 6. The scanner function data table storage area 223 stores a scanner function data table 83 (which will be described later) shown in FIG. 7. The service management data table storage area 224 stores a service management data table 84 (which will be described later) shown in FIG. 8. The scan data storage area 225 stores the image data read by the scanner apparatus 7.

The session information storage area 226 stores session information. Specifically, the session information represents information about a session of the central server 2 and the scanner apparatus 7. The session information may be information about a session of an apparatus, which can be connected to the network 6 in addition to the scanner apparatus 7, and the central server 2. The central server 2 stores the session information about the scanner apparatus 7, so that the central server 2 can transmit a reading instruction to the scanner apparatus 7. The session information is stored, so that the information can be transmitted and received between the central server 2 and the scanner apparatus 7.

The RAM 23 temporarily stores information that is temporarily used by the central server 2. The communication unit 24 is connected to the network 6 of FIG. 1. The CPU 21 performs communication with the operation apparatus 3, the network service 4, the network service 5 and the scanner apparatus 7 through the communication unit 24 and the network 6.

4. Electrical Configuration of Scanner Apparatus 7

An electrical configuration of the scanner apparatus 7 is described with reference to FIG. 5. The scanner apparatus 7 has a CPU 75, an HDD 76, a RAM 77, a communication unit 78, a reading unit 79 and a detection unit 80. The HDD 76, the RAM 77, the communication unit 78, the reading unit 79 and the detection unit 80 are electrically connected to the CPU 75, respectively. The CPU 75 functions as a computer that controls the scanner apparatus 7.

Figure 11:
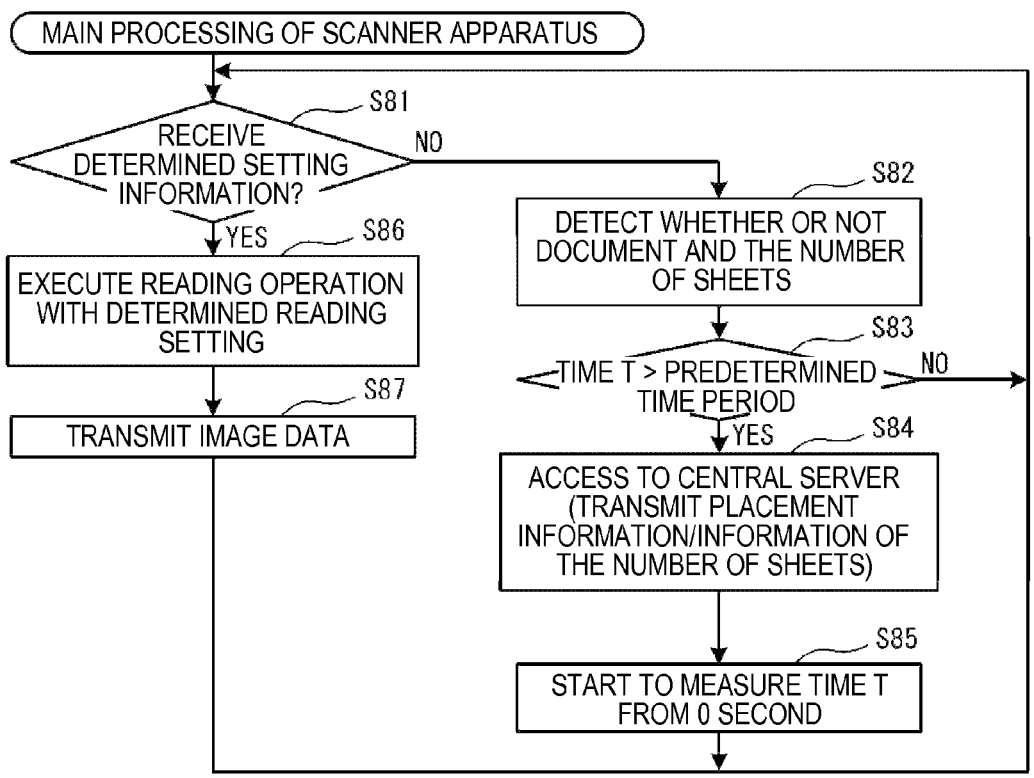
FIG. 11 is an example of a flow chart of main processing of the scanner apparatus 7.

The HDD 76 includes a program storage area 761, a scan data storage area 762 and a session information storage area 763. The program storage area 761 stores a program of main processing of the scanner apparatus 7, which is shown in FIG. 11, and the like. The program may be downloaded from a predetermined server on the network 6, for example. The program may be recorded in a recording medium such as a CD-ROM and the like and may be read and input through a drive. The scan data storage area 762 stores image data that is read by the reading unit 79.

The session information storage area 763 stores session information. In this illustrative embodiment, the scanner apparatus 71 or central server 2 periodically checks a session, so that the session information is stored in the session information storage area 763. The scanner apparatus 7 stores the session information, so that the scanner apparatus 7 can receive a variety of information transmitted from the central server 2.

The RAM 77 temporarily stores information that is temporarily used by the scanner apparatus 7. The communication unit 78 is connected to the network 6 of FIG. 1. The CPU 75 performs communication with the central server 2 through the communication unit 78 and the network 6.

The reading unit 79 has a configuration for reading the document 89 set on the scanner apparatus 7. Specifically, the reading unit 79 has a conveyance roller, an image reading sensor and the like. The image reading sensor is an imaging device such as a CIS (Contact Image Sensor), a CCD (Charge Coupled Sensor) and the like. The reading unit 79 having a function of reading the image data is driven, so that the image data is acquired from the document 89. The detection unit 80 detects whether the document 89 is placed on the scanner apparatus 7 and the number of the placed documents 89. The detection unit 80 may detect whether the document 89 is placed on an ADF (Auto Document Feeder) (not shown) and the number of the placed documents 89, for example. The detection unit 80 may detect whether a cover (for example, a unit of an openable/closable ADF) covering a reading face on which a document is placed and which is provided above the image reading unit is opened or closed and may detect whether or not the document 89.

The scanner data table 82 is described with reference to FIG. 6. In the scanner data table 82, at least the scanner information, the access token, a model type, a status, document placement and the number of documents are registered in the scanner data table 82. The scanner information, the access token, a model type, a status, document placement and the number of documents are associated in the scanner data table 82. Specifically, 'P001', 'XXXX', 'M001', 'on-line', 'no placement' and '0 sheet' are associated in order of the scanner information, the access token, the model type, the status, the document placement and the number of documents. In addition, the association as shown in FIG. 6 is made.

As described above, the scanner information is the information for identifying the scanner apparatus 7. In this illustrative embodiment, the scanner information of the scanner apparatus 71 is referred to as 'P001'. The scanner information of the scanner apparatus 72 is referred to as 'P002'. The scanner information of the scanner apparatus 73 is referred to as 'P003'. The scanner information of the scanner apparatus 74 is referred to as 'P004'. The scanner information of a scanner apparatus (not shown) is referred to as 'P005'. The scanner information 'P001', 'P002', 'P003' and 'P004' are associated with the access token 'XXXX'. That is, the scanner apparatuses 71, 72, 73, 74 are the scanner apparatus 7 that is possessed by the user of the operation apparatus 3.

The model type represents information indicating a model type of the scanner apparatus 7. In this illustrative embodiment, the model type associated with the scanner information 'P001', 'P002', 'P003' and 'P005' is 'M001'. The model type associated with the scanner information 'P004' is 'M002'. The status represents information indicating whether the scanner apparatus 7 is connected to the central server 2 through the network 6. When the scanner apparatus 7 is connected to the central server 2 through the network 6, 'on-line' is set, and otherwise, 'off-line' is set. The document placement represents information indicating whether the document 89 is placed on the scanner apparatus 7. The number of documents represents information indicating the number of documents 89 placed on the scanner apparatus 7.

The scanner function data table 83 is described with reference to FIG. 7. In the scanner function data table 83, function information representing one or more of functions relating to the model type of the scanner apparatus 7 is registered. In the scanner function data table 83, the function information represents at least a maximum resolution, a duplex reading, a reading speed, a color and a size. The maximum resolution, the duplex reading, the reading speed, the color and a size are associated in the scanner function data table 83 as the function information. Specifically, 'M001', '600 dpi', 'non-correspondence', '24 sheets/minute', 'color, monochrome' and 'A3, A4, B5, name card size' are associated in order of the model type, the maximum resolution, the duplex reading, the reading speed, the color and the size. Likewise, 'M002', '200 dpi', 'correspondence', '12 sheets/minute', 'monochrome' and 'A3, A4, B5' are associated.

The maximum resolution is a maximum resolution when the scanner apparatus 7 prepares image data. The duplex reading represents information indicating whether the reading corresponds or does not correspond to a duplex reading. The reading speed represents information of a reading speed when the scanner apparatus 7 reads the document 89. The color is a color when the scanner apparatus 7 prepares image data. When the color is 'color', the scanner apparatus 7 can prepare image data of a color image. When the color is 'monochrome', the scanner apparatus 7 can prepare image data of a monochrome image. The size is a size of an image that can be prepared by the scanner apparatus 7.

The service management data table 84 is described with reference to FIG. 8. In the service management data table 84, the service identification information, a URL (Uniform Resource Locator), a category and the setting information are registered in the service management data table 84. The service identification information, the URL, the category and the setting information are associated in the service management data table 84. The setting information includes a resolution, a color, a size, a reduction setting and an association service. Specifically, 'S001', 'http://aa', 'document', '300 dpi or higher, maximum resolution', 'first page: color, second page and thereafter: monochrome', 'first page: A4, second page and thereafter: double page spread (A3)', 'lowering the resolution to 200 dpi' and 'no' are associated. In addition, the association as shown in FIG. 8 is made.

Figure 3:
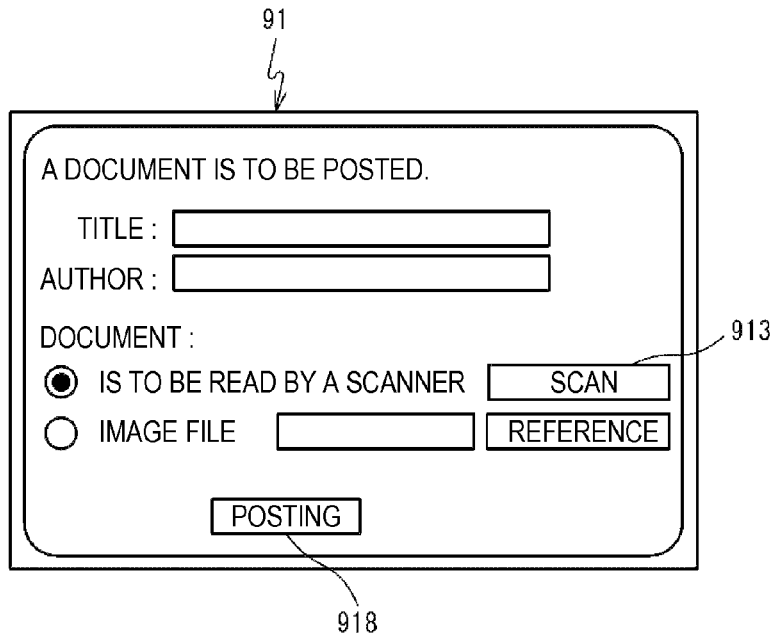
FIG. 3 shows an example of a Web page 91.

The service identification information represents information for identifying a service that is provided by the external server 10. In this illustrative embodiment, the service identification information of a document service that is provided by the external server 50 is referred to as 'S001'. The service identification information of a name card management service that is provided by the external server 40 is referred to as 'S002'. The service identification information of a service that is provided by the other external server is referred to as 'S003', 'S004' and the like. In the meantime, the external server 10 provides the operation apparatus 3 with a Web page on which the scan execution button is displayed. For example, the external server 50 provides the operation apparatus 3 with the Web page 91 on which the scan execution button 913 shown in FIG. 3 is displayed. When the scan execution button 913 is operated, the service identification information is transmitted to the central server 2 from the external server 50 and is received at the central server 2 (refer to an arrow 14 of FIG. 2). For this reason, the service identification information is also information indicating a provision source of the Web page on which the scan execution button 913 is displayed.

The URL represents information indicating locations of the external servers 40, 50 and the like on the network. Instead of the URL, an IP address may be registered. The category represents information indicating a type of a service that is provided by the external servers 40, 50 and the like. In the meantime, a 'receipt' is a service of reading information of a receipt and reflecting the same on a household account, for example. An 'article' is an article posting service.

The setting information registered in the service management data table 84 represents information of a reading setting corresponding to a specification that is demanded by the external server 10. The reading setting is set with a specification that is demanded by the external server 10 corresponding to the service identification information. The resolution is a resolution that is demanded when the scanner apparatus 7 prepares image data. For example, the resolution '300 dpi or higher and maximum resolution' indicates that the image data is prepared with a resolution of 300 dpi or higher and maximum resolution that can be read by the scanner apparatus 7. The color indicates a setting of a color that is demanded when the scanner apparatus 7 prepares image data. For example, the color 'first page: color, second page and thereafter: monochrome' indicates that a first page is prepared with image data of a color image and a second page and thereafter are prepared with image data of a monochrome image. The size indicates a size that is demanded when the scanner apparatus 7 prepares image data. For example, the size 'first page: A4, second page and thereafter: double page spread (A3)' indicates that a first page is prepared with image data of an A4 size and a second page and thereafter are prepared with image data of an A3 size by a double page spread. In the meantime, when an A4 size is arranged with the double page spread, it becomes an A3 size.

The reduction setting is a setting for reducing a data amount of image data. When the external server 10 stores the image data, if a remaining amount of the storage area is insufficient, the setting information is changed to the reduction setting (S25 of FIG. 9). In other words, the reduction setting is a setting of an operation of the scanner apparatus 7 when a remaining amount of the storage area, in which the external server 10 stores the image data, is insufficient. For example, the reduction setting of 'lowering the resolution to 200 dpi' indicates that a resolution, which is demanded when the scanner apparatus 7 prepares image data, is set to be 200 dpi.

The association service indicates that the external server 10 demands data after it performs a variety of processing in association with other services (not shown). For example, when the association service is 'OCR service for a name card', the image data read by the scanner apparatus 7 is transmitted from the central server 2 to a server (not shown) that provides an OCR service for a name card. In the server, text data is extracted from the image data by an OCR (Optical Character Reader). The extracted text data is transmitted from the server to the central server 2. The central server 2 transmits the text data to the external server 40 that provides a name card management service. Although not shown in main processing of the central server 2 shown in FIGS. 9 and 10, the scanner apparatus 7 may process the image data by using the association service as described above and cause the external server 10 to acquire the same.

5. Operations of Central Server 2

Main processing of the central server 2 is described with reference to FIGS. 9 and 10. The main processing of the central server 2 is executed by the CPU 21. The main processing of the central server 2 is executed when a power supply becomes on and is over when the power supply becomes off. In the below descriptions, each processing step is abbreviated to 'S'. In the below descriptions, an example where a user operates the operation apparatus 3 to thus log in the external server 50 and to post the document 89 to the document service is described as a specific example.

First, it is determined whether the reading instruction, the service identification information, the access token and the remaining amount are received (S11). The reading instruction, the service identification information, the access token and the remaining amount are transmitted from the external server 10 as the scan execution button is operated by the operation apparatus 3 (the arrows 13 and 14 of FIG. 2). By the reading instruction, a scan instruction API (Application Program Interface) of the central server 2 is called, for example. The reading instruction may include a URL of the external server 10 to which the central server 2 notifies that reading of the image data by the scanner apparatus 7 is over. Instead of the URL of the external server 10, an IP address of the external server 10 may be included in the reading instruction. The remaining amount acquired in S11 represents information of the remaining amount of the storage area of the storage device of the external server 10, such as the storage servers 51, 52 of the external server 50.

Here, the access token that is transmitted from the external server 10 is described. The access token is issued by the CPU 21 of the central server 2. More specifically, for example, when the user operates the operation apparatus 3 to thus log in the external server 10 or when the scan execution button is operated, the external server 10 issues a request for delegation of authority, which enables the user of the operation apparatus 3 to use the central server 2, to the central server 2. When the request for delegation of authority is issued, the CPU 21 of the central server 2 receives login processing from the operation apparatus 3. The user operates the operation apparatus 3 to thus input a user ID and the like, thereby executing the login. When the login is executed from the operation apparatus 3, the CPU 21 issues an access token. The issued access token is transmitted to the external server 10 that is a source of the request. The external server 10 associates the transmitted access token and the user ID and stores the same in a predetermined storage area. The external server 10 specifies the stored access token from the user ID transmitted from the operation apparatus 3 and transmits the same to the central server 2. In S11, the access token transmitted from the external server 10, as described above, is received.

When issuing the access token, the CPU 21 associates the access token and the user ID and registers the same in an access token database (not shown) and stores the same in the HDD 22. The CPU 21 updates the scanner data table 82 shown in FIG. 6 so that the access token associated with the scanner information of the scanner apparatus 7 possessed by the user of the operation apparatus 3 becomes the issued access token. Meanwhile, in the scanner data table 82 shown in FIG. 6, the user ID other than the access token may be registered with being associated with the scanner information.

When reading instruction, the service identification information, the access token and the remaining amount are not received (S11: NO), it is determined whether the access is made from the scanner apparatus 7 (S12). The scanner apparatus 7 accesses the central server 2 in S84 of FIG. 11 that will be described later. In S84, when the document 89 is placed on the scanner apparatus 7, the access to the central server 2 is made and the placement information and the information of the number of sheets are transmitted to the central server 2. The placement information represents information indicating that the document 89 is placed on the scanner apparatus 7. The information of the number of sheets represents information about the number of the documents 89 placed on the scanner apparatus 7. As shown in FIG. 9, when it is determined that there is no access from the scanner apparatus 7 (S12: NO), the CPU 21 returns the processing to S11.

When it is determined that there is an access from the scanner apparatus 7 (S12: YES), the processing of S13 is executed. In S13, a session between the scanner apparatus 7 having made the access in S12 and the central server 2 is maintained. Specifically, the session information is stored in the session information storage area 226. In S13, the status of the scanner data table 82 shown in FIG. 6 is set to be 'on-line' for the scanner apparatus 7 having made the access. When the placement information is transmitted in S84 of FIG. 11, the 'document placement' of the scanner data table 82 shown in FIG. 6 is set to be 'placement'. When the information of the number of sheets is transmitted in S84 of FIG. 11, the information of the number of sheets is stored in 'the number of documents' of the scanner data table 82 of FIG. 6. In the meantime, when the CPU 21 specifies the scanner apparatus 7 having made the access, the scanner information is transmitted to the central server 2 in S84 of FIG. 11 and the CPU 21 specifies the scanner apparatus on the basis of the transmitted scanner information. After the processing of S13 is executed, the CPU 21 returns the processing to S11.

When the reading instruction and the like are received (S11: YES), it is determined whether the external server 50 having transmitted the reading instruction to the central server 2 is a registered network service (S14). Specifically, in S14, it is determined whether the service identification information acquired in S11 is stored in the service management data table 84. If yes, it is determined that the external server is a registered network service. On the other hand, when the service identification information is not stored, it is determined that the external server is not a registered network service. When it is determined that the external server is not a registered network service (S14: NO), an error code is transmitted to the external server 10 having transmitted the reading instruction to the central server 2 (S15). The external server 10 having received the transmitted error code transmits data of an error screen to the operation apparatus 3. The operation apparatus 3 displays an error screen on the display unit 36.

When it is determined that the external server is a registered network service (S14: YES), the scanner information associated with the access token received in S11 is specified from the plurality of scanner information stored in the scanner data table 82 of FIG. 6 (S16). That is, based on the access token, the scanner apparatus 7 that is possessed by the user who operates the operation apparatus 3 is specified. In the specific example, the access token received in S11 is referred to as 'XXXX'. In this case, in the scanner data table 82 of FIG. 6, the scanner information 'P001', 'P002', 'P003' and 'P004' associated with 'XXXX' is specified. That is, the scanner apparatuses 71 to 74 of FIG. 1 are specified as the scanner apparatus 7 that is possessed by the user who operates the operation apparatus 3. The specified scanner information is stored in the RAM 23. On the other hand, when the user ID other than the access token is registered in the scanner data table 82, the CPU 21 refers to the access token database and specifies the user ID associated with the access token received in S11. Then, in the scanner data table 82, the scanner information associated with the specified user ID is specified.

Then, the scanner information of the scanner apparatus 7 connected to the network 6 is specified from the scanner information specified in S16 (S17). In the scanner data table 82 of FIG. 6, the 'status' of 'P001', 'P002' and 'P004' of the scanner information specified in S16 is 'on-line'. For this reason, in the specific example, the scanner information 'P001', 'P002' and 'P004' is specified in S17. The specified scanner information is stored in the RAM 23.

Then, the setting information associated with the service identification information received in S11 is acquired from the service management data table 84 of FIG. 8 (S18). The service identification information of the document service that is provided by the external server 50 is 'S001'. For this reason, in the specific example, the service identification information received in S11 is 'S001'. Hence, the setting information associated with 'S001' in the service management data table 84 of FIG. 8 is acquired. The acquired setting information includes the resolution '300 dpi or higher, a maximum resolution', the color 'first page: color, second page and thereafter: monochrome' and the size 'first page: A4, second page and thereafter: double page spread (A3)'. In the meantime, the reduction setting is not acquired in S18 because it is acquired in S25 that will be described later. Since the association service is 'no', the reading setting of the association service is not acquired. The acquired setting information is stored in the RAM 23.

Then, the scanner information of the scanner apparatus 7 that can execute a reading operation by the setting information acquired in S18 is specified from the scanner information specified in S17 (S19). In the specific example, the scanner information specified in S17 is 'P001', 'P002' and 'P004'. The CPU 21 refers to the scanner data table 82 of FIG. 6 and specifies the model type 'M001' of the scanner information 'P001' and 'P002' and the model type 'M002' of the scanner information 'P004'. The CPU 21 refers to the scanner function data table 83 of FIG. 7 and specifies a plurality of specific function information of the specified model types 'M001' and 'M002'. For example, the CPU 21 determines that the scanner apparatus represented by the model type 'M001' can execute the reading operation represented by the setting information, using the specific function information. The maximum resolution, the color and the size of the model type 'M001' are '600 dpi', 'color, monochrome' and 'A3, A4, B5, name card size', respectively. The maximum resolution, the color and the size of the model type 'M002' are '200 dpi', 'monochrome' and 'A3, A4, B5', respectively. The setting information acquired in S17 includes the resolution '300 dpi or higher, a maximum resolution', the color 'first page: color, second page and thereafter: monochrome' and the size 'first page: A4, second page and thereafter: double page spread (A3)'. For this reason, the scanner apparatus 7 that can execute the setting information acquired in S17 is the model type 'M001'. Therefore, the scanner information 'P001' and 'P002' of the model type 'M001' is specified. The specified scanner information is stored in the RAM 23.

Then, the scanner data table 82 of FIG. 6 is referred to, so that the scanner information of the scanner apparatus 7 on which the document 89 is placed is specified from the scanner information specified in S19 (S20). In the specific example, the scanner information 'P002' of which 'document placement' of the scanner data table 82 is 'placement' is specified. Then, it is determined whether the scanner information of the scanner apparatus 7 on which the document 89 is placed is specified, as a result of S20 (S21). When the scanner information of the scanner apparatus 7 on which the document 89 is placed is not specified (S21: NO), S26 to S29 of FIG. 10 are executed. In S26 to S29, the CPU 21 causes the operation apparatus 3 to acquire the specified scanner information and the setting information acquired in S18.

The processing of S26 to S29 is described. First, a Web page including the setting information acquired in S18 and the like is prepared and is then stored in the Web page storage area 227 (S26). An example of the prepared Web page will be described later. Then, a URL indicating the Web page storage area 227 in which the Web page is stored is transmitted to the operation apparatus 3 (S27).

Then, it is determined whether a request for a Web page for the URL transmitted in S27 is received (S28). The request for a Web page is transmitted from the operation apparatus 3. When the request for a Web page is not received (S28: NO), the CPU 21 repeats the processing of S28. When the request for a Web page is received (S28: YES), the Web page prepared in S26 is transmitted to the operation apparatus 3 (S29, an arrow 15 of FIG. 2). The transmitted Web page is displayed on the display unit 36 of the operation apparatus 3.

An example of the Web page prepared in S26 is described. The Web page prepared in S26 is different depending on processing results of S16 to S25. In the specific example, it is assumed that the document placement of the scanner information 'P002' of the scanner data table 82 of FIG. 6 is 'no placement' and the number of documents is '0 sheet'. In this case, in S20, the scanner information of the scanner apparatus 7 on which the document 89 is placed is not specified. For this reason, it is determined that the scanner information of the scanner apparatus 7 on which the document 89 is placed is not specified (S21: NO), and processing of S26 is executed.

In S26, a first Web page (not shown) is prepared, for example. The first Web page has a scanner display area and a reading setting display area. In the scanner display area, icons indicating the scanner information 'P001', 'P002', 'P003' and 'P004' specified in S16 are displayed. Hereinafter, the icon indicating the scanner information is referred to as a scanner apparatus icon. In S17, the scanner information 'P001', 'P002' and 'P004' of the scanner apparatus 7 connected to the network 6 is specified. For this reason, the scanner apparatus 7 having the scanner information 'P003' is not connected to the network 6. Hence, in the scanner display area, an operation-impossibility display is displayed around the scanner apparatus icon of the scanner information 'P003'. The operation-impossibility display is an area that is solidly filled with black or gray, for example. The user of the operation apparatus 3 cannot select the scanner information in the operation-impossibility display.

In S19, the scanner information 'P001' and 'P002' of the scanner apparatus 7 that can execute a reading operation based on the setting information acquired in S18 is specified. For this reason, the scanner information of the scanner information 'P004' is not the scanner information of the scanner apparatus 7 that can execute a reading operation based on the setting information acquired in S17. Hence, the operation-impossibility display is displayed around the scanner apparatus icon of the scanner information 'P004'.

The scanner information 'P001' and 'P002' can be selected by the operation apparatus 3, in response to a user's instruction. The operation apparatus 3 can select the scanner apparatus icon of the scanner information 'P001' or scanner information 'P002', in response to a user's instruction.

The information that is displayed in the reading setting display area is prepared on the basis of the setting information acquired in S18. In S18, the resolution '300 dpi or higher, maximum resolution' is acquired. In the scanner function data table 83 of FIG. 7, the maximum resolution of the model type 'M001' of the scanner information 'P001' is '600 dpi'. Therefore, for example, the resolution '600 dpi' is set and displayed in the reading setting display area. In the meantime, the operation apparatus 3 may change the resolution, in response to a user's operation. At this time, the resolution to be changed is limited to the resolution '300 dpi or higher' acquired in S18.

In S18, the color 'first page: color, second page and thereafter: monochrome' and the size 'first page: A4, second page and thereafter: double page spread (A3)' are acquired. For this reason, a text of 'first page: color A4' and 'second page and thereafter: monochrome A3 double page spread' is displayed in the reading setting display area, for example.

In the service management data table 84 of FIG. 8, the service identification information 'S001' is associated with the category 'document'. For this reason, a text of 'scan for a document' is displayed in the reading setting display area, for example. The scan execution button is displayed in the reading setting display area. The operation apparatus 3 operates the scan execution button, in response to a user's operation.

The first Web page is prepared as described above. The first Web page includes the scanner information specified in S16, S17 and S19. The first Web page includes the setting information acquired in S18. That is, the setting information of a specification that is demanded by the external server 50 is included. The CPU 21 prepares the first Web page in S26 and causes the operation apparatus 3 to acquire the same in S27 to S29, so that the specified scanner information and the setting information acquired in S18 are acquired.

In S21 of FIG. 9, when the scanner information of the scanner apparatus 7 on which the document 89 is placed is specified (S21: YES), the number of documents in the scanner data table 82 of FIG. 6 is specified. In the example shown in FIG. 6, the number of documents '30 sheets' of the scanner information is specified. The specified number of documents is stored in the RAM 23. Then, based on the setting information acquired in S18, a data amount of the image data acquired in the scanner apparatus 7 is determined (S23). The data amount is determined, as follows, for example. In the HDD 22, a data amount of image data per one image sheet when the setting information such as the color, the monochrome image, the resolution 600 dpi and the like is set is beforehand stored. In S23, the data amount, which corresponds to the setting information acquired in S18 and is beforehand stored in the HDD 22, is acquired and is multiplied by the number of placed sheets acquired in S22, so that a data amount is determined.

Then, it is determined whether the data amount determined in S23 is larger than the remaining amount acquired in S11 (S24). When the data amount determined in S23 is not larger than the remaining amount acquired in S11 (S24: NO), processing of S26 is executed. In this case, the CPU 21 prepares a second Web page (not shown) in S26.

The second Web page is described. In the below descriptions, differences to the first Web page are described. In the specific example, in S20, the scanner information 'P002' of the scanner apparatus 7 on which the document 89 is placed is specified. For this reason, in the second Web page, a placement display, which is a display indicating that the document 89 is placed, is displayed as regards the scanner apparatus icon of the scanner information 'P002'. The placement display is a display including a text 'a document is placed', for example.

In S24, when the data amount determined in S23 is larger than the remaining amount acquired in S11 (S24: YES), the setting information is changed to the setting information of the reduction setting (S25). In S25, the service management data table 84 of FIG. 8 is referred to and the 'reduction setting' corresponding to the service identification information acquired in S11 is acquired. In the specific example, the reduction setting 'lowering the resolution to 200 dpi', which corresponds to the service identification information 'S001', is acquired. Then, processing of S26 is executed. In this case, the CPU 21 prepares a third Web page (not shown). The third Web page is described. In the below descriptions, differences to the second Web page are described. In S25, the reduction setting 'lowering the resolution to 200 dpi' is acquired. For this reason, the resolution is changed to '200 dpi' and is displayed. A text 'the resolution is lowered to 200 dpi due to the insufficiency of the service storage area', for example, is displayed in the reading setting display area. Thereby, the user of the operation apparatus 3 is notified that the resolution is changed.

After processing of S29 shown in FIG. 10 is executed, it is determined whether the setting information and scanner information, which are determined on the basis of the setting information and scanner information acquired by the operation apparatus 3 in S26 to S29, are received (S30). That is, the setting information and scanner information, which are determined by the user of the operation apparatus 3 while referring to the Web page transmitted in S29, are received. In the below descriptions, the setting information, which is determined on the basis of the setting information acquired by the operation apparatus 3 in S26 to S29, is referred to as 'determined setting information'. The scanner information, which is determined on the basis of the scanner information acquired by the operation apparatus 3 in S26 to S29, is referred to as 'determined scanner information'. The determined setting information and determined scanner information are transmitted from the operation apparatus 3 (an arrow 16 of FIG. 2).

When the determined setting information and determined scanner information are not received (S30: NO), the CPU 21 repeats the processing of S30. When the determined setting information and determined scanner information are received (S30: YES), the determined setting information is transmitted to the scanner apparatus 7 based on the determined scanner information (S31, an arrow 17 of FIG. 2). The transmitted determined setting information is received by processing of S81 of FIG. 11. The determined scanner information is referred to as 'P002'. The determined setting information is referred to as the resolution '600 dpi', the color 'first page: color, second page and thereafter: monochrome' and the size 'first page: A4, second page and thereafter: double page spread (A3)'. In this case, the resolution '600 dpi', the color 'first page: color, second page and thereafter: monochrome' and the size 'first page: A4, second page and thereafter: double page spread (A3)' are transmitted to the scanner apparatus 72 corresponding to the determined scanner information 'P002'.

Then, it is determined whether the image data read by the scanner apparatus 7 is received, based on the determined setting information transmitted in S31 (S32). The image data is transmitted from the scanner apparatus 7 by processing of S87 of FIG. 11 (which will be described later) (the arrow 18 of FIG. 2). When the image data is not received (S32: NO), the CPU 21 repeats the processing of S32. When the image data is received (S32: YES), processing of S33 and S34 is executed and the image data can be acquired by the external server 10.

In S33, the received image data is stored in the scan data storage area 225. In S34, a URL of the scan data storage area 225 in which the image data is stored is transmitted to the external server 10. In the specific example, since the reading instruction and the like are transmitted from the external server 50 in S11, the URL is transmitted to the external server 50.

Then, it is determined whether a download request for the URL transmitted in S34 is received (S35). The download request is transmitted from the external server 10. When the download request is not received (S35: NO), the CPU 21 repeats the processing of S35. In the meantime, when a predetermined time period elapses after the processing of S35 is repeated, the processing of S35 may be over and the processing of S11 may be executed.

When the download request is received (S35: YES), the image data is transmitted to the external server 10 that is a source of the request (S36, an arrow 19 of FIG. 2). The transmitted image data is received by the external server 10. Then, the image data stored in the scan data storage area 225 in S33 is erased (S37). In the meantime, the image data may not be erased. The case where the image data is erased and the case where the image data is not erased may be switched depending on the instruction of the external server 10. Then, the CPU 21 returns the processing to S11 of FIG. 9.

6. Operations of Scanner Apparatus 7

Main processing of the scanner apparatus 7 is described with reference to FIG. 11. The main processing of the scanner apparatus 7 is executed by the CPU 75. The main processing of the scanner apparatus 7 is executed when a power supply becomes on and is over when the power supply becomes off.

It is determined whether the determined setting information transmitted from the central server 2 is received or not (S81). The determined setting information is transmitted from the central server 2 in S31 of FIG. 10 (the arrow 17 of FIG. 2). When the determined setting information is not received (S83: NO), it is detected whether the document 89 is placed on the scanner apparatus 7 and the number of documents is detected (S82). Then, it is determined whether time T is longer than a predetermined time period (S83). The time T is measured from 0 in S82 that will be described later. In the meantime, when the processing of S83 of a first time is executed, it is determined that the time T is longer than the predetermined time period. The predetermined time period is 15 seconds, for example. When the time T is not longer than the predetermined time period (S83: NO), the CPU 75 returns the processing to S81.

When the time T is longer than the predetermined time period (S83: YES), the access to the central server 2 is executed (S84). In this case, it is determined in S12 of FIG. 2 that the access is made from the scanner apparatus 7. In the meantime, in S84, when the document 89 is placed on the scanner apparatus 7, the displacement information and the information of the number of sheets are transmitted to the central server 2. The session information is stored in the session information storage area 763. Thereby, the scanner apparatus 7 maintains the session with the central server 2. Then, the time T is measured from '0 second' (S85). Then, the CPU 75 returns the processing to S81.

When the determined setting information is received (S81: YES), the reading operation is executed with the reading setting based on the received determined setting information, so that the image data is acquired (S86). Thereby, the document 89 is read with a specification that is demanded by the external server 50, so that the image data is acquired. The acquired image data is stored in the scan data storage area 762. Then, the image data acquired in S86 is transmitted to the central server 2 (S87, the arrow 18 of FIG. 2). That is, the CPU 75 uploads the image data to the central server 2. The transmitted image data is received by the processing of S32 of FIG. 10. Then, the CPU 75 returns the processing to S81.

7. Main Operations and Effects of this Illustrative Embodiment

The processing of this illustrative embodiment is executed as described above. In the service management data table 84 shown in FIG. 8, the service identification information and the setting information are associated with each other. The setting information registered in the service management data table 84 is the information of the reading setting corresponding to the specification that is demanded by the external server 10 providing the service. The setting information associated with the service identification information received in S11 is acquired from the service management data table 84 (S18). Therefore, the setting information acquired in S18 becomes the setting information of the specification that is demanded by the external server 10. The CPU 21 causes the operation apparatus 3 to acquire the setting information acquired in S18. In this illustrative embodiment, the setting information acquired in S18 is included in the reading setting display area of the Web page. The determined setting information, which is determined on the basis of the setting information acquired by the operation apparatus 3 in S26 to S29, is received (S30: YES). The received determined setting information is transmitted to the scanner apparatus 7 (S31). For this reason, the scanner apparatus 7 can acquire the image data by reading the document 89 with the reading setting corresponding to the specification that is demanded by the external server 10 (S86 of FIG. 11). Hence, the image data becomes the image data of the specification that is demanded by the external server 10. The image data acquired in the scanner apparatus 7 is transmitted to the central server 2 (S87 of FIG. 11) and is received by the CPU 21 of the central server 2 (S32: YES). Then, the image data can be acquired by the external server 10 (S33 and S34).

Like this, the central server 2 automatically acquires the reading setting corresponding to the specification that is demanded by the external server 10 and causes the external server 10 to acquire the image data of the specification that is demanded by the external server 10. Therefore, it is not necessary for the user to manually set the reading setting, which corresponds to the specification that is demanded by the external server 10, in the scanner apparatus 7. Hence, the user convenience is improved. The user can easily determine an image reading apparatus, which can execute the reading operation by the setting information acquired in S18, as an image reading apparatus that executes a reading operation.

In the meantime, the disclosure is not limited to the above illustrative embodiment and can be variously changed. For example, the scanner information of the scanner apparatus 7 connected to the network 6 is specified (S17). However, the scanner apparatus 7 connected to the network 6 may not be specified. The scanner information of the scanner apparatus 7 that can execute the reading operation by the setting information acquired in S18 is specified (S19). However, the scanner information of the scanner apparatus 7 that can execute the reading operation by the setting information acquired in S18 may not be specified. The scanner information of the scanner apparatus 7 on which the document 89 is placed is specified (S20). However, the scanner information of the scanner apparatus 7 on which the document 89 is placed may not be specified. When the data amount determined in S23 is larger than the remaining amount acquired in S11, the setting information is changed to the setting information of the reduction setting in S23 to S25. However, the setting information may not be changed to the setting information of the reduction setting. The reduction setting is not limited. For example, the reduction setting may be a setting of compressing image data to thereby reduce a data amount.

In S26 to S29, the setting information and scanner information acquired in S18 are acquired by the operation apparatus 3. However, the method of enabling the operation apparatus 3 to acquire the setting information and scanner information is not limited. For example, the setting information and scanner information may be notified to the operation apparatus 3, so that the operation apparatus 3 acquires the setting information and scanner information. For example, the scanner information may not be acquired by the operation apparatus 3.

The reading information is not limited to the above illustrative embodiment. For example, the service management data table 84 may include, as the reading information, a color limit that is a limit on the number of sheets of an image, which is read as a color image by the scanner apparatus 7. The service management data table 84 may include, as the reading information, a monochrome limit that is a limit on the number of sheets of an image, which is read as a monochrome image by the scanner apparatus 7. That is, the service management data table 84 may include, as the reading information, at least one of the color limit and the monochrome limit. In this case, in S16, the setting information including at least one of the color limit and the monochrome limit associated with the service identification information is acquired. Therefore, the image data that is received in S32 becomes image data for which the number of sheets is limited as regards at least one of the color limit and the monochrome limit. In S33 and S34, the external server 10 may acquires the image data for which the number of sheets is limited as regards at least one of the color limit and the monochrome limit. Hence, the external server 10 can acquire the image data for which the number of sheets is limited. Therefore, the external server 10 can reduce a storage capacity for storing the image data. In the meantime, the reading information may include the other information of various reading settings.

In S20, the scanner information of the scanner apparatus 7 on which the document 89 is placed is specified from the scanner information specified in S19. However, in S20, the scanner apparatus 7 on which the document 89 is placed may be specified from the scanner information specified in S16. In this case, the placement display may be displayed. In this case, the user who uses the operation apparatus 3 can easily recognize the scanner apparatus 7 on which the document 89 is placed. Therefore, the user can easily determine the scanner apparatus 7 on which the document 89 is placed, as an image reading apparatus that executes a reading operation. In this modified embodiment, the CPU 21 that executes the processing of S20 is an example of the sixth specifying means of the disclosure.

What is claimed is:

1. A system comprising:
   an information processing apparatus;
   a particular image reading apparatus configured to communicate with the information processing apparatus through a network; and
   an operation apparatus including a display, the operation apparatus being configured to communicate with the information processing apparatus through the network, wherein the information processing apparatus comprises:
a first processor; and
first memory storing computer readable instructions, when executed by the first processing, causing the information processing apparatus to execute:
a service identification information storing instructive of storing, in a memory, service identification information for identifying a service providing apparatus, and setting information representing a specification of a reading setting of an image reading apparatus for the service providing apparatus, in association with the service identification information;
a first reading instruction receiving instruction of receiving, from an operation apparatus, a reading instruction for instructing an image reading apparatus to execute a reading operation and specific service identification information;
a setting information acquiring instruction of acquiring the setting information associated with the specific service identification information from the memory;
a Web page preparing instruction of preparing a Web page including the acquired setting information;
the Web page transmitting instruction of transmitting the prepared Web page to the operation apparatus;
a specific setting information receiving instruction of receiving specific setting information from the operation apparatus after the prepared Web page is transmitted;
a reading instruction transmitting instruction of transmitting a second reading instruction to the particular image reading apparatus;
a specific setting information transmitting instruction of transmitting the specific setting information to the particular image reading apparatus for reading image data in the particular image reading apparatus;
an image data receiving instruction of receiving the image data from the particular image reading apparatus after the specific setting information is transmitted; and
an image data transmitting instruction of transmitting the image data to the service providing apparatus,
wherein the particular image reading apparatus comprises:
a second processor; and
second memory storing computer readable instructions, when executed by the second processor, causing the particular image reading apparatus to execute:
a specific setting information receiving instruction of receiving the specific setting information from the information processing apparatus;
a second reading instruction receiving instruction of receiving the second reading instruction from the information processing apparatus;
an image data reading instruction of reading image data based on the specific setting information; and
an image data transmitting instruction of transmitting the image data to the information processing apparatus, and
wherein the operation apparatus comprises;
a display unit;
a third processor, and
third memory storing computer readable instructions, when executed by the third processor, causing the operation apparatus to execute:

a reading instruction transmitting instruction of transmitting the first reading instruction to the information processing apparatus;
a Web page receiving instruction of receiving the Web page from the information processing apparatus;
a Webpage displaying instruction of displaying the received Web page on the display unit;
a specific setting information determining instruction of determining a specific setting information with reference to the displayed Web page; and
a specific setting information transmitting instruction of transmitting the determined specific setting information to that information processing apparatus.

2. An information processing apparatus comprising:
a processor; and
memory storing computer readable instructions, when executed by the processor, causing the information processing apparatus to:
a service identification information storing instruction of storing, in a memory, service identification information for identifying a service providing apparatus, and setting information representing a specification of a reading setting of an image reading apparatus for the service providing apparatus, in association with the service identification information;
a session information receiving instruction of receiving, from a particular image reading apparatus, session information about a session of the information processing apparatus and the particular image reading apparatus, and storing the session information in the memory so that the information processing apparatus can transmit a second reading instruction to the scanner apparatus;
a session information storing process of storing the received session information in the first memory;
the information processing apparatus executes the specific setting information transmitting process after the received session information is stored in the memory;
a reading instruction receiving instruction of receiving, from an operation apparatus, a first reading instruction for instructing an image reading apparatus to execute a reading operation and specific service identification information;
a setting information acquiring instruction of acquiring the setting information associated with the specific service identification information from the memory;
a Web page preparing instruction of preparing a Web page including the acquired setting information;
a setting information transmitting instruction of transmitting the prepared Web page to the operation apparatus;
a specific setting information receiving instruction of receiving specific setting information from the operation apparatus after the received session information is stored in the memory;
a reading instruction transmitting instruction of transmitting a second reading instruction to a particular image reading apparatus;
a specific setting information transmitting instruction of transmitting the specific setting information to a particular image reading apparatus for reading image data in the particular image reading apparatus;
an image data receiving instruction of receiving image data from the particular image reading apparatus; and
an image data transmitting instruction of transmitting the image data to the service providing apparatus.

3. The information processing apparatus according to claim 2,
  wherein the service identification information storing instructions comprises storing a plurality of the service identification information and a plurality of the setting information, each of the plurality of the service identification information in association with each of the plurality of the setting information, and
  wherein the setting information acquiring information comprises acquiring the setting information associated with the specific service identification information among the plurality of the setting information.

4. The information processing apparatus according to claim 2,
  wherein the setting information includes at least one of color information representing the number of sheets that is read as color image data by an image reading apparatus, and monochrome information representing the number of sheets that is read as monochrome image data by an image reading apparatus.

5. An information processing apparatus comprising:
  a processor; and
  memory storing computer readable instructions, when executed by the processor, causing the information processing apparatus to:
  a service identification information of storing, in a memory, service identification information for identifying a service providing apparatus, setting information representing a specification of a reading setting of an image reading apparatus for the service providing apparatus, in association with the service identification information,
  and storing, in the memory, user identification information, a plurality of apparatus identification information for identifying a plurality of image reading apparatuses in association with the user identification information,
  a reading instruction receiving instruction of receiving, from an operation apparatus, a first reading instruction for instructing an image reading apparatus to execute a reading operation and specific service identification information, the specific service identification information, and specific user identification information, and
  a setting information acquiring instruction of acquiring the setting information associated with the specific service identification information from the memory;
  an apparatus identifying instruction of identifying the plurality of apparatus identification information associated with the specific user identification information from the memory;
  a setting information transmitting instruction of transmitting the acquired setting information to the operation apparatus;
  a specific setting information receiving instruction of receiving specific setting information from the operation apparatus;
  a specific setting information transmitting instruction of transmitting the specific setting information to the identified particular image reading apparatus for reading image data in the particular image reading apparatus;
  an image data receiving instruction of receiving image data from the identified particular image reading apparatus; and
  an image data transmitting instruction of transmitting the image data to the service providing apparatus.

6. The information processing apparatus according to claim 5,
  wherein the service identification information storing instruction comprises storing, in the memory, a plurality of function information in association with each of the plurality of apparatus identification information, each of the plurality of the function information representing a function represents each of the image reading apparatuses can execute the reading operation,
  wherein the computer-readable instructions, when executed by the processor, further cause the information processing apparatus to execute:
  an apparatus identifying instruction of identifying, among the identified plurality of apparatus identification information, one or more of the apparatus identification information representing one or more of image reading apparatuses can execute the reading operation represented by the acquired setting information using one or more of the plurality of function information,
  wherein the setting information transmitting instruction comprises transmitting the acquired setting information and the identified one or more of the plurality of apparatus identification information to the operation apparatus,
  wherein the specific setting information receiving instruction comprises receiving, from the operation apparatus, the specific setting information and specific apparatus identification information, and
  wherein the specific setting information transmitting instruction comprises transmitting the specific setting information to the particular image reading apparatus identified by the specific apparatus identification information.

7. The information processing apparatus according to claim 5,
  wherein the computer readable instructions when executed by the processor further cause the information processing apparatus to execute:
  an apparatus identifying instruction of identifying one or more of the apparatus identification information of one or more of image reading apparatuses which are connecting to a network among the identified the plurality of apparatus identification information,
  wherein the setting information acquiring information comprises transmitting, to the operation apparatus, the acquired setting information and the identified one or more of the plurality of apparatus identification information,
  wherein the specific setting information receiving instruction comprises receiving, from the operation apparatus, the specific setting information and specific apparatus identification information, and
  wherein the specific setting information transmitting instruction comprises transmitting the specific setting information to the particular image reading apparatus identified by the specific apparatus identification information.

8. The information processing apparatus according to claim 5,
  wherein the service identification information storing instruction comprises storing, in the memory, a plurality of function information in association with each of the plurality of apparatus identification information, each of the plurality of the function information representing a function represents each of the image reading apparatuses can execute the reading operation,
  wherein the computer-readable instructions, when executed by the processor, further cause the information processing apparatus to execute:
  an apparatus identification information identifying instruction of identifying one or more of the apparatus identification information of one or more of image reading apparatuses which are connecting to a network among the identified the plurality of apparatus identification information; and a first apparatus identification information instruction of identifying, among the identified one or more of the plurality of apparatus identification information, one or more of first apparatus identification information representing one or more of image reading apparatuses can execute the reading operation represented by the acquired setting information using one or more of the plurality of function information, wherein the setting information transmitting instruction comprises transmitting, to the operation apparatus, the acquired setting information and the one or more of first apparatus identification information, wherein the specific setting information receiving instruction comprises receiving, from the operation apparatus, the specific setting information and specific apparatus identification information, and wherein the specific setting information transmitting instruction comprises transmitting the specific setting information to the particular image reading apparatus identified by the specific apparatus identification information.

9. The information processing apparatus according to claim 5, wherein the service identification information storing instruction comprises storing, in the memory, a plurality of function information in association with each of the plurality of apparatus identification information, each of the plurality of the function information representing a function represents each of the image reading apparatuses can execute the reading operation, wherein the computer-readable instructions, when executed by the processor, further cause the information processing apparatus to execute:

an apparatus identification information identifying instruction of identifying one or more of the apparatus identification information of one or more of image reading apparatuses which are connecting to a network among the identified the plurality of apparatus identification information;

a first apparatus identification information instruction of identifying, among the identified one or more of the plurality of apparatus identification information, one or more of first apparatus identification information representing one or more of image reading apparatuses can execute the reading operation represented by the acquired setting information using one or more of the plurality of function information, and a second apparatus identification information instruction of identifying one or more of second apparatus identification information of one or more of image reading apparatuses on which a reading target is placed, among the one or more of first apparatus identification information;

wherein the acquired setting information transmitting apparatus comprises transmitting the acquired setting information and the one or more of second apparatus identification information to the operation apparatus, wherein the specific setting information receiving instruction comprises receiving, from the operation apparatus, the specific setting information and specific apparatus identification information, and wherein the specific setting information transmitting apparatus comprises transmitting the specific setting information to the particular image reading apparatus identified by the specific apparatus identification information.

10. The information processing apparatus according to claim 5, wherein the computer readable instructions when executed by the processor further cause the information processing apparatus to execute:

an apparatus identification information identifying instruction of identifying one or more of apparatus identification information of one or more of particular image reading apparatuses on which a reading target is placed, among the identified the plurality of apparatus identification information, wherein the setting information transmitting instruction comprises transmitting the acquired setting information and the identified one or more of apparatus identification information to the operation apparatus, wherein the specific setting information receiving instruction comprises receiving, from the operation apparatus, the specific setting information and specific apparatus identification information, and wherein the specific setting information transmitting instruction comprises transmitting the specific setting information to the particular image reading apparatus identified by the specific apparatus identification information.

11. The system according to claim 1, wherein the second memory of the particular image reading apparatus stores session information about a session of the information processing apparatus and the particular image reading apparatus so that the information processing apparatus can transmit the second reading instruction to the scanner apparatus, the computer readable instructions stored in the second memory, when executed by the second processor, causes the particular image reading apparatus to execute a session information transmitting process of transmitting the session information to the information processing apparatus, the computer readable instructions stored in the first memory, when executed by the first processor, causes the information processing apparatus to execute:

a session information receiving process of receiving the session information transmitted from the image reading; and a session information storing process of storing the received session information in the first memory, the information processing apparatus executes the specific setting information transmitting process after the received session information is stored in the first memory.

12. The system according to claim 11, wherein when the received session information is stored in the first memory, the computer readable instructions stored in the first memory, when executed by the second processor, causes the information processing apparatus to execute an online setting process of setting a status of the particular image reading apparatus to be on-line, the Web page transmitting instruction causes the information processing apparatus to transmit the prepared Web page to the particular image reading apparatus, status of which is set to be on-line.

13. A system comprising:

a processor; and memory storing computer readable instructions, when executed by the first processor, causing the information processing apparatus to:

a service identification information of storing, in a memory, service identification information for identifying a service providing apparatus, setting information representing a specification of a reading setting of an image reading apparatus for the service providing apparatus, in association with the service identification information, and storing, in the memory, user identification information, a plurality of apparatus identification information for identifying a plurality of image reading apparatuses in association with the user identification information, a reading instruction receiving instruction of receiving, from an operation apparatus, a reading instruction for instructing an image reading apparatus to execute a reading operation and specific service identification information, the specific service identification information, and specific user identification information, a setting information acquiring instruction of acquiring the setting information associated with the specific service identification information from the memory;

an apparatus identification information identifying instruction of identifying the plurality of apparatus identification information associated with the specific user identification information from the memory, a setting information transmitting instruction of transmitting the acquired setting information to the operation apparatus;

a specific setting information receiving instruction of receiving specific setting information from the operation apparatus;

a specific setting information transmitting instruction of transmitting the specific setting information to the identified particular image reading apparatus for reading image data in the particular image reading apparatus;

an image data receiving instruction of receiving the image data from the identified particular image reading apparatus; and an image data transmitting instruction of transmitting the image data to the service providing apparatus, wherein the particular image reading apparatus comprises:

a second processor; and second memory storing computer readable instructions, when executed by the second processor, causing the particular image reading apparatus to execute:

a specific setting information receiving instruction of receiving the specific setting information from the information processing apparatus;

an image data reading instruction of reading image data based on the specific setting information; and an image data transmitting instruction of transmitting the image data to the information processing apparatus.

* * * * *